United States Patent [19]

Lowman

[11] 4,169,509
[45] Oct. 2, 1979

[54] COMBINATION GARDEN TOOL WITH REMOVABLE WEIGHT

[75] Inventor: Carl W. Lowman, Costa Mesa, Calif.

[73] Assignee: Alpha Nova Engineering Corp., Santa Ana, Calif.

[21] Appl. No.: 883,318

[22] Filed: Mar. 3, 1978

[51] Int. Cl.² .............................................. A01B 1/20
[52] U.S. Cl. ................................... 172/375; 172/611
[58] Field of Search ............... 172/371, 372, 375, 378, 172/380, 381; D8/6, 7, 9, 10, 11, 13

[56] References Cited

U.S. PATENT DOCUMENTS

| D. 57,057 | 2/1921 | Kreklewicz | D8/11 |
|---|---|---|---|
| D. 150,067 | 6/1948 | Fleming | D8/6 |
| 641,925 | 1/1900 | Blundell | 172/611 X |
| 2,201,436 | 5/1940 | Jones | 172/375 |
| 3,952,812 | 4/1976 | Lucan | 172/375 |
| 4,037,668 | 7/1977 | Svejda | 172/371 |

FOREIGN PATENT DOCUMENTS

| 497319 | 11/1953 | Canada | 172/375 |
|---|---|---|---|
| 238956 | 12/1945 | Switzerland | 172/378 |
| 567999 | 3/1945 | United Kingdom | 172/375 |

Primary Examiner—Richard T. Stouffer
Attorney, Agent, or Firm—William C. Babcock

[57] ABSTRACT

An improved garden tool comprising an end plate attached to a tubular fitting extending vertically from the substantial center thereof, the tubular fitting being adapted to receive a wooden handle. The end plate itself is cut in plan form to provide a conventional hoe blade extending over a segment of an arc with a Warren hoe and a rake equally spaced therefrom. The hoe blade surface is further provided with two openings for securing a lead weight biasing the hoe in a preferred orientation. Furthermore the plate area of the Warren hoe and the rake is distributed to provide equal weight distribution, thus insuring a balanced configuration during the use of the hoe which entails the most pronounced impact stroke.

3 Claims, 6 Drawing Figures

U.S. Patent     Oct. 2, 1979     4,169,509
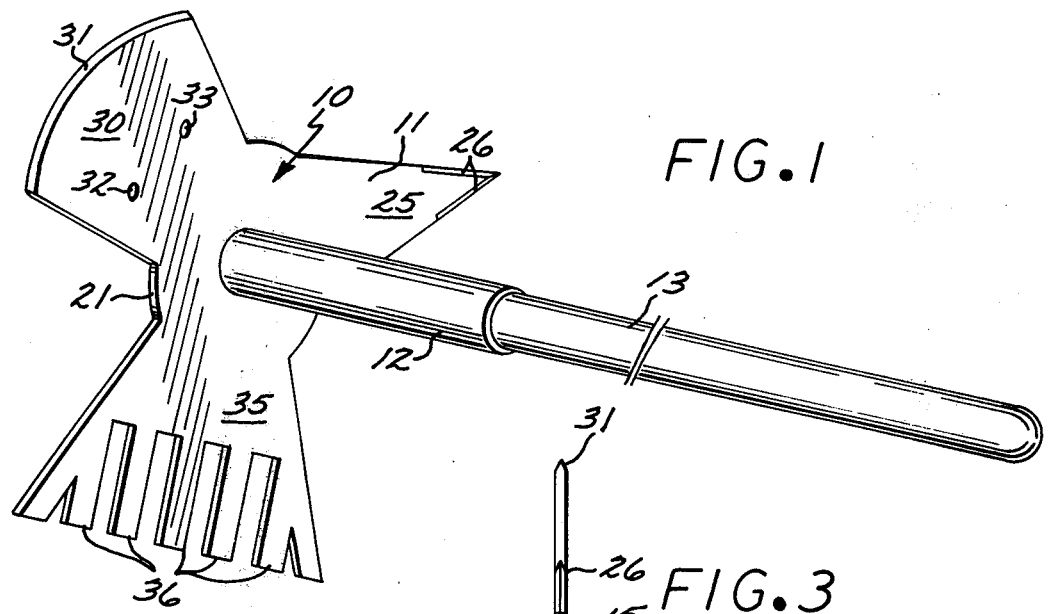
FIG.1
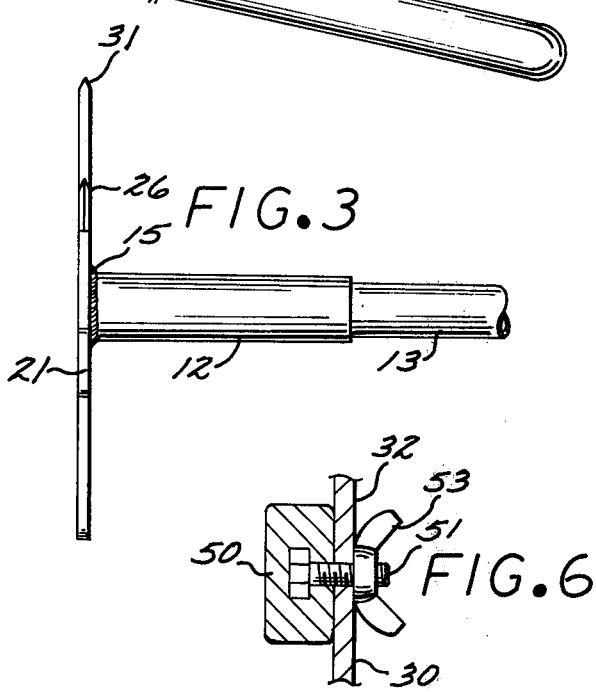
FIG.3
FIG.6
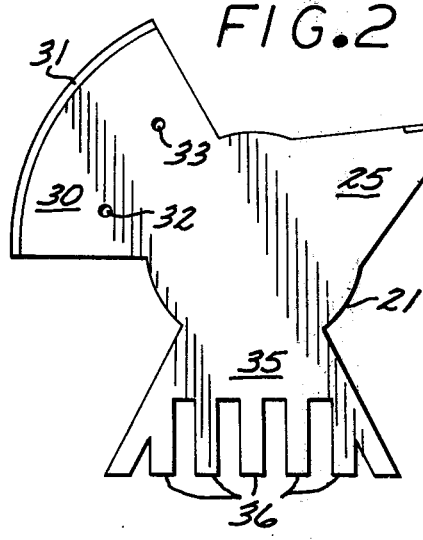
FIG.2
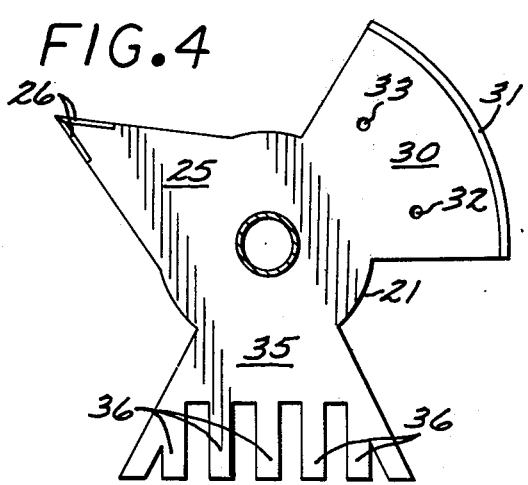
FIG.4
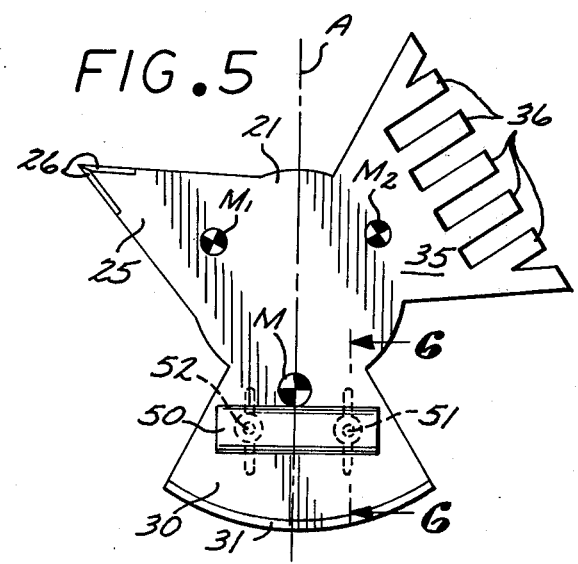
FIG.5

COMBINATION GARDEN TOOL WITH REMOVABLE WEIGHT

BACKGROUND OF THE INVENTION

1. Field of the Invention

The present invention relates to garden tools, and more particularly to combinations of garden tools adapted for manual use.

2. Description of the Prior Art

Garden tools have had extensive development in the past resulting in a variety of specialized tool configurations. Even in the more basic gardening endeavors a minimal complement of tools is required to perform the necessary functions. For example first the ground is weeded, cleared and broken up by a hoe, then the furrow for receiving seeds is made, the seeds are deposited and the furrow is then raked over to cover the seeds. Accordingly at least three tools are entailed presenting a storage problem. For this reason there have been various tool combinations developed in the past most often, however, conformed out of thin metal structures in order to minimize the weight and any unbalance of the combined tool head. The reduction in metal thickness concurrently entails a weaker tool with a very frequent occurrence of tool breakage or bending. In addition tool combinations of the foregoing kind were often not configured for the heavier strokes entailed in gardening and were not adaptable for the necessary weight bias entailed in such strokes. For example the process of hoeing requires a relatively vigorous stroke during which the hoe blade, by its own weight, is directed towards the ground. Should the tool also include the various other tool ends the weight bias is shifted away from the desired preference thus providing torsional loads during impact.

SUMMARY OF THE INVENTION

Accordingly, it is the general purpose and object of the present invention to provide a combination garden tool arraged for minimal unbalanced loads.

Additional objects of the invention are to provide a combination garden tool which is adapted to receive weights for a preferred bias.

Yet further objects of the invention are to provide a combination garden tool which is conveniently manufactured out of flat sheet stock.

Yet additional objects of the invention are to provide a combination garden tool which may be conveniently stored in an upright position on the tool end.

Briefly these and other objects are accomplished within the present invention by forming a substantially planar tool end which is secured by welding to one end of a tubular mount extending vertically proximate the center thereof. The tubular mount receives the ocnventional wooden handle in the other end to provide the manipulative structure for a variety of tool shapes distributed at equal increments of arc around the periphery of the tool end. One configuration is conformed to provide conventional hoe blade, the other two edge configurations being shaped to form the pointed end of a Warren hoe and the plurality of teeth of a rake. It is contemplated to maintain the surface dimensions of the Warren hoe and the rake in a balanced condition about the central axis of the tubular mount, thus insuring a well balanced hoe which is normally loaded with the larger impacts. In addition the hoe blade may be provided with two openings in the face thereof through which studs extending from a lead weight are insertable to be secured thereat by wing nuts, thus biasing the hoe blade in the blade-down preferred bias.

BRIEF DESCRIPTION OF THE DRAWINGS

FIG. 1 is a perspective illustration of a combination garden tool constructed according to the present invention;

FIG. 2 is an end view of the garden tool shown in FIG. 1;

FIG. 3 is a side view of the garden tool shown in FIG. 1;

FIGS. 4 and 5 are alternative end views illustrating the alignment of the tool for the various other gardening operations provided therein; and FIG. 6 is a sectional view taken along line 6—6 of FIG. 5 illustrating the installation of a lead weight onto the hoe blade segment of the garden tool disclosed herein.

DESCRIPTION OF THE PREFERRED EMBODIMENTS

As shown in FIGS. 1, 2 and 3 the combination garden tool generally designated by the numeral 10 includes an end plate 11 attached to one end of a tubular mount 12 extending vertically from the proximate center thereof. The tubular mount 12, in the other end thereof, receives a wooden handle 13 useful in manipulating the tool. The attachment of the tubular mount to the end plate 11 may be achieved in various manners, the preferred manner illustrated herein being by way of a butt weld 15.

Plate 11 extends orthogonally from the end of the tubular mount and is cutout around the periphery thereof to provide three separate tool ends spaced at equal increments of arc. More specifically plate 11 comprises a central disc 21 which forms a hub from which a triangular Warren hoe blade 25 extends along one azimuth, a conventional hoe blade 30 extending along a second azimuth and a triangularly shaped rake 35 extending along a third azimuth. The Warren hoe blade 25 is aligned to direct the apex thereof radially distal from the center of the hub. This apex may be chamfered to provide sharp edges 26 on either side thus forming a sharp point for parting compacted earth. The conventional hoe blade 30 is formed as a circular segment, in common plane with the hub 21, the periphery thereof being, once more, chamfered along an arcuate chamfer 31 forming the sharp edge of the tool. Provided in the face of the hoe blade 30 are two openings 32 and 33 disposed between at equal radiis from the center or hub 21. Openings 32 and 33 are separated by a dimensioned equal to the separation between two bolts 51 and 52 which are imbedded by their heads in a lead weight 50. As shown in FIGS. 5 and 6, bolts 51 and 52 are received in openings 32 and 33 attaching the lead weight 50 to the hoe blade 30 by corresponding wing nuts 53 and 54.

In a similar manner the rake 35 extends as a peripheral projection of the center plate 21, the plan form of the rake being, once more, substantially triangular forming outwardly towards the periphery of the tool end to deploy a plurality of cutout teeth 36 at the free edge thereof. The dimensions of the teeth and the separations therebetween reduce the outboard weight of the rake 35 to locate the resulting center of mass thereof at a substantially equal separation from an axis of symmetry A passing between the two openings 32 and 33 in the hoe blade 30.

As shown in FIG. 5 the Warren hoe 25 by virtue of its substantially uniform thickness and planform provides a center of mass $M_1$ about two thirds of the radius increment inboard of the apex thereof. Similarly a center of mass $M_2$ of the rake 35 is biased inwardly by the outboard cutouts and teeth 36. Thus by proper selection of angle and depth of teeth it is possible to achieve a relatively balanced configuration with respect to the central axis of symmetry A. Since the largest impact strokes will typically occur with the use of the hoe blade 30 this balanced state is of significant advantage. Furthermore should there be any small unbalance build up either by virtue of manufacturing tolerances or by virtue of dirt accumulating on the tool end the circular cutting edge 31 on the periphery of blade 30 further minimizes impact unbalances. The net result is an overall center of mass M aligned below the central axis of the tubular mount 12 at substantially in the middle of hoe blade itself. This downward bias of the hoe closely approximate the conventionally biased of the prior art hoes and therefore allows for the conventional stroke technique acquired. Upon the selection of the other tool end the weight 50 is conveniently removable by releasing the wing nuts 53, the typical manipulative strokes involved in raking or forming a furrow by the Warren hoe requiring low impact levels and therefore being accommodated in the tool edge itself.

Obviously many modifications and variations to the above disclosure can be made without departing from the spirit of the invention. It is therefore intended that the scope of the invention be determined solely on the claims appended hereto.

What is claimed is:

1. A combination garden tool comprising:

a tubular mount;

handle means attached to one end of said mount;

an end plate attached to the other end of said mount, said end plate including a central disc extending orthogonally relative to said mount shaped in planform around the periphery thereof, said end plate further including a triangular Warren hoe extending from said disc with the apex thereof aligned radially distal of said disc, a triangularly shaped rake extending in a radial fan out from said disc and deploying a plurality of fingers at the free edge thereof, and a triangularly shaped hoe blade extending from said disc having a base conformed as a circular edge segment radially distal of said disc, said Warren hoe, said rake and said hoe blade being spaced at substantially equal increments of arc around the periphery of said disc; and a removable weight spaced inwardly from said circular edge and of sufficient mass to substantially change the position of the center of mass of said end plate when attached thereto, said weight selectively secured directly to a surface of said hoe blade and spaced radially outwardly from said tubular mount for providing a weight bias for said hoe blade.

2. Apparatus according to claim 1 wherein:

said end plate comprises a metal plate of substantially equal thickness; and said Warren hoe and said rake include planform dimensions selected to distribute substantially equal weights on either side of said hoe blade.

3. Apparatus according to claim 2 wherein:

said Warren hoe and said hoe blade each include chamfered edges.

* * * * *